Figure 1:
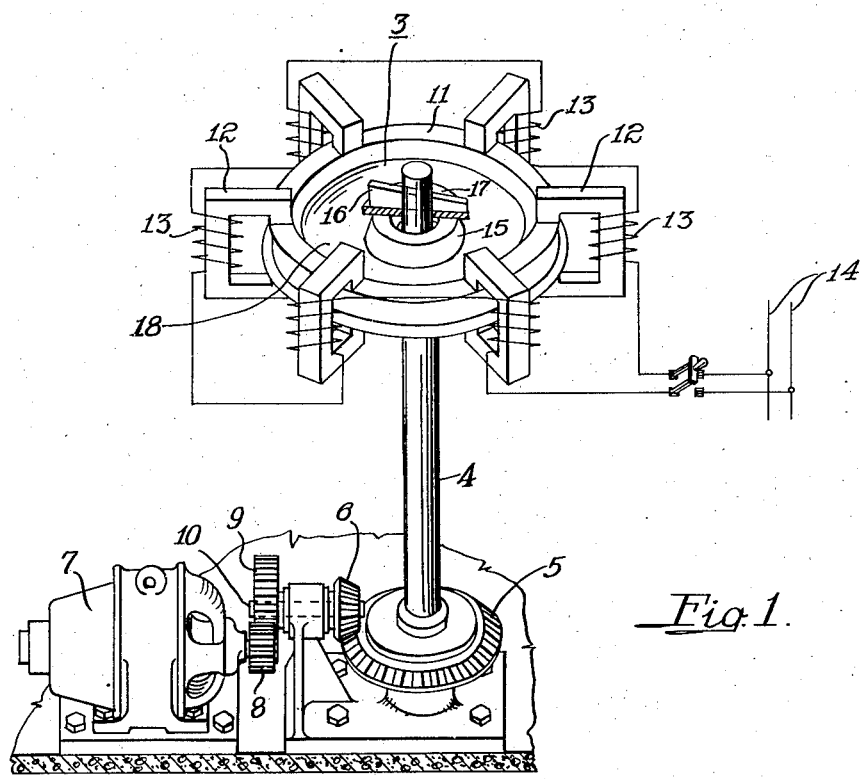

Dec. 9, 1941.    L. E. ENDSLEY    2,265,275
METHOD OF TREATING CAR WHEELS
Filed July 31, 1939

INVENTOR
Louis E. Endsley
By Archworth Martin
His Attorney

Patented Dec. 9, 1941

2,265,275

UNITED STATES PATENT OFFICE 2,265,275

METHOD OF TREATING CAR WHEELS

Louis E. Endsley, Pittsburgh, Pa.

Application July 31, 1939, Serial No. 287,557

6 Claims. (Cl. 148—10)

My invention has for its object the method of producing or treating solid, one-piece railway car wheels in such manner that the completed wheel has its rim portion in tension and the plate portion thereof in compression, whereby danger of cracking of the wheel through development of heat therein upon application of the brake shoe is minimized. Briefly stated, my invention comprises quickly heating only the rim of a wheel, electrically, to such extent that when cooled slowly the rim will be placed under tensional stress and the plate portion under compression.

In car wheels as commonly made, the threads thereof are usually under compression or in some cases under no stress—either tension or compression. In either case, the very high heat which is developed in a wheel tread surface upon the application of the brake shoes at high speeds often produces sufficient heat to cause overstraining of the metal while it is being heated through friction of the brake shoes and when it cools off, with the result that the tread of the wheel cracks and thermal checks are produced therein crosswise of the thread. For example, in the case of a standard railway car wheel of 36" diameter and with the train moving at a speed of 80 miles per hour, the heat generated in the wheel tread when bringing the train to a stop in 40 seconds and with a load of 15,000 lbs. on the the wheel, would be approximately 3200 B. t. u., assuming that 75% of the total braking energy entered the wheel.

As another example of the amount of heat which is generated in a wheel tread, if it be assumed that 64% of the total braking energy entered the wheel during a stop under a load of 12,000 lbs., from an initial speed of 100 miles per hour, in 40 seconds, about 3200 B. t. u. would enter the wheel.

In a wheel treated according to my invention, the surface of the tread of the wheel will be initially under a tension of 12,000 to 20,000 lbs. per square inch. Under this tension, as the brake shoe of the wheel is applied, 60° F. to 100 F. more heat will have to be developed in order to get this surface to a zero point of stress. After which, if more heat is applied, the stress will increase, as it would if the wheel were manufactured with the rim in compression, but there will be a difference of many degrees in the heat which the wheel can take care of without excessive stress in the surface of the thread.

This invention is particularly applicable in the treatment of cast, forged or rolled steel one-piece car wheels. In wheels of this character, immediately after casting, rolling or forging, the hub portion, of course, will cool more slowly than the rim portion, with the result that the rim will contract in radial directions relative to the hub, thereby placing the plate portion of the wheel under compression and perhaps even forging it slightly into the hub. During this early stage, the plate and the rim become cooler than the hub which, by reason of being much hotter than the other parts of the wheel, continues to shrink and develops tension in the plate. This tension in the plate produces a compression stress in the rim of the wheel.

In a standard car wheel, of approximately 33 inch diameter, with a 5½ inch tread and 3 inch rim thickness, the shrinkage of the hub will place the plate under very great stresses which may be to the elastic limit of the metal and perhaps to the extent of 40,000 lbs. to 60,000 lbs. per square inch.

The treads of these wheels are commonly then machined to produce a true circle, and thereupon put into use. However, due to the rim of the wheel being under a compression stress, any heat from the brake shoe produces a still greater compressive stress, as the surface heats up faster than other parts of the rim. This causes excessive compression stresses in the wheel tread and overstrains it, so that when it cools down again, cracks crosswise of the tread of the wheel, known as thermal cracks, are often produced.

I propose to overcome this difficulty by reversing the compression stress usually found in the tread of a wheel, which is now detrimental, to a tension stress of from 12,000 to 20,000 lbs. per square inch. By this method, if the wheel is produced with a 20,000 lb. stress in tension in the wheel, there will be no compression in the surface of the wheel until about 100° F. rise in surface temperature has occurred, as through the application of the brake shoe. Thus the final compression stress through brake shoe heat will be approximately 20,000 lbs. less than it would be if the wheel had no stress at the time the brake shoe pressure was first applied.

I contemplate the treatment of heat treated or untreated wheels, wherein the rims may initially be under either no stress, compression stress or slight tensional stress, so as to place the rims under what would be considered a high tensional stress—of from 12,000 to 20,000 lbs. per square inch.

In practicing my invention, I prefer to take the wheels which have been so made that the rim is initially under a compression stress and the plate under a tension stress; this for the deliberate purpose of avoiding cracking of the rim when machining the tread.

In machining metal with a cutting tool, the metal is actually sheared off through putting of the metal ahead of the tool under compression. This break between the surface metal and the chip is accomplished by actually breaking the metal. If this surface of the metal being machined is under compression, the tendency to crack below the surface is much less than if the metal is under tension in a direction parallel to the path of the tool. The danger of incipient small cracks is therefore much less, if the surface has a compression stress in it rather than a tension stress, during machining. Such incipient cracks would of course aggravate and even start the forming of thermal cracks under brake shoe heat. Thus I prefer to have the tread under compression when machining, as is easily possible in making the wheels, and then to reverse this stress to a tension stress before putting the wheel in service.

Figure 2:
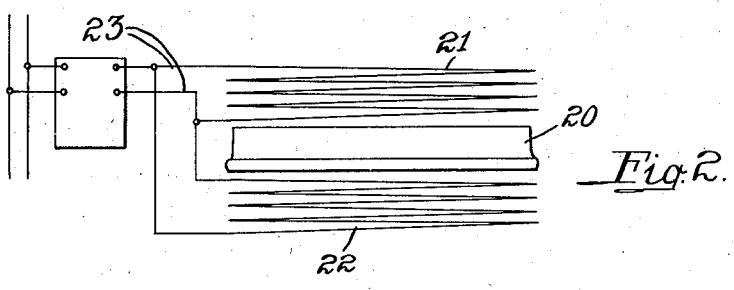
Figure 3:
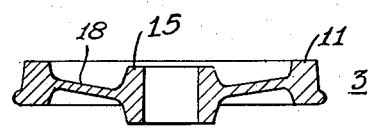

After the wheel has been machined and trued to tread, by my process I deliberately reverse these stresses and put the rim of the wheel under tension and the plate of the wheel under compression, so that the rim of the wheel will take care of a very much larger amount of brake shoe heat without overstraining its surface and producing thermal cracks. This reversal in stresses I effect by heating the rim electrically, as for example, by the apparatus disclosed in the accompanying drawing, wherein Figure 1 is a perspective view showing a manner in which a wheel may be heated in the practice of my invention; Fig. 2 shows another manner in which the wheels may be heated, and Fig. 3 is a sectional view through one form of a standard car wheel.

Details of the operating and control mechanism and devices for the heating devices for the structure of Fig. 1 are set forth at length in my Patent 2,188,569, and only so much of the apparatus is here shown as is necessary to an understanding of the invention. In this figure, a car wheel is designated by the numeral 3. The wheel is suitably detachably supported upon a shaft 4 that at its lower end carries a bevel gear wheel 5 that is driven by a pinion 6. A motor 7 through a pinion 8 and a gear wheel 9 that is secured to a shaft 10 which carries the pinion 6, serves as motive power for rotating the car wheel. The wheel rim 11 is positioned between C-shaped cores 12, each of which is provided with an energizing coil 13 supplied with electrical current from a line 14. The shaft 4 is provided with a seat for vertically supporting the hub 15 of the wheel, and the wheel hub is securely connected to the shaft by a wedge or key 16 that is driven through a slot-like hole in the shaft 4, its underside engaging a washer or disc 17 that rests upon the top of the hub.

The rim of the wheel is rotated in the magnetic field of each of the magnets 12 when the coils 13 thereof are energized, preferably from a D. C. source, the total field strength of these magnets being of such intensity that with the wheel rotating at about 330 revolutions per minute, heating currents of such value will be produced in the rim as will cause the rim to be increased in temperature approximately 300° F., within one or two minutes. The rim is heated throughout its entire cross-sectional area substantially simultaneously by these electrical currents in the rim, all parts of the rim being heated to substantially a uniform temperature. In car wheels of certain standard sizes, this would represent about 5,000 to 6,000 B. t. u. During rotation of the wheel, the table and the electro-magnets are held stationary.

In order to increase the effectiveness of the heating currents induced in the rim, I preferably employ an even number of electro-magnets 12 and arrange them so that each magnet is of opposite polarity with respect to the polarity of adjacent magnets. That is, during rotation of the wheel, a point on the rim passes successively through flux lines moving in opposite directions, since the north and south poles of one magnet are arranged oppositely to the north and south poles of the adjacent magnets.

Since the value of the currents induced in the rim of the wheel is dependent upon rim speed and magnetic field strength, and the time required to heat the rim is dependent upon the value of the induced currents, the time required to heat the rim can be varied by changing the rim speed, the field strength or by utilizing a greater or lesser number of electro-magnets. However, the power required to effect a given increase in the temperature of the rim will be equal to the power expanded in the motor 7, less the mechanical and electrical losses of the apparatus employed. Thus, the current supplied to the motor 7 affords an accurate index to the rise in rim temperature for a given size wheel, so that the heating of wheels of any size can easily be controlled by controlling the amount of energy supplied to the motor 7.

The heating of the wheel rim effects expansion thereof and consequently creates radial stress sufficient to overstrain and lengthen the plate 18 of the wheel, as heretofore explained. The rim of the wheel can be permitted to cool in the air and, upon cooling thereof, the plate portion 18 of the wheel will be put into compression and the rim under tension. The rotation of the wheel rim in a series of magnetic fields distributed in an annular path, results in rapid and quite uniform heating thereof.

In Fig. 2, I show a wheel 20 whose rim is heated by electric current induced therein by coils 21 and 22, which are disposed at opposite sides of the rim of the wheel and are connected to a source of high frequency A. C. by conductors 23; the current induced in the rim causing rapid increase in the temperature of the rim portion, the wheel preferably being rotated during heating of the rim to effect substantially uniform heating at all points around the rim.

The advantage of rapidly heating the rim is to effect the desired difference in temperature as between the rim and the plate portion very quickly, so that no heat will be transmitted back into the plate and hub and thus require a greater rim temperature for doing the work. This difference in temperature is quickly established without material heat losses when the rim is heated by electrical currents induced therein, as above described, since such currents are effective to raise the temperature simultaneously at all points throughout the cross-sectional area of the rim. Thus, the rim is heated interiorly at the same time that it is heated exteriorly, the heating rate being substantially uniform at all parts of the rim so that no undesirable stresses are set up in the rim by thus heating the same.

This invention differs from the process of my said patent in that instead of merely reducing the stress in the plate portion of the wheel, I propose now to place the plate portion as well as the rim portion of the wheel under stresses, the plate being placed under a compression stress sufficient to cause the rim portion to be under a tension of 12,000 lbs. or more, per square inch.

This will require heating the rim portion to approximately 100° F. to 150° F. higher than is done in my said patent. In the present instance, when starting with the wheel at room temperature, I heat the rim to from 400° F. to 450° F., which is still a temperature that will not appreciably affect the hardness of the wheel. The rim is heated quickly (within perhaps one or two minutes), so that the plate portion of the wheel will not be materially heated, but will be placed under great stretching stress, with increased radial dimension. When the wheel rim cools down again to room temperature, the plate will be longer than before and thus the rim will be placed under tension, by reason of the plate being under compression.

The compression stress in the plate of the wheel, which results from cooling of the rim, is balanced by a tension stress in the rim of the wheel. The compression stress thus produced in the plate results in a tangential tension stress in the rim of the wheel.

The amount of expansion of the rim necessary to elongate the plate when the entire rim is brought to said higher temperature, will not require 400° or a little more on any now used size of wheel.

In the case of an A. R. A. standard 36 inch wheel with a 5½ inch tread including the flange, and 2¾ inch rim thickness, satisfactory results can be obtained by heating the rim to approximately 375° F. In the case of smaller wheels with less length and offset of plate, this temperature would be less, and for larger wheels with longer plates and greater offset, the temperature would be greater.

I claim as my invention:

1. The method of producing tension in the tread of a one-piece steel car wheel that has a hub portion, a rim portion and a plate portion, which comprises quickly heating the rim of the wheel by rotating it through a magnetic field, to a temperature below one at which it would be appreciably softened, but to such temperature in excess of the plate and hub temperatures that the plate will be overstrained to a permanent elongation of such extent that when the rim has been cooled to the same temperature as the plate, the plate will be thereby placed under a compression stress and the tread surface of the rim under a tension stress.

2. The method of producing tension in the tread of a one-piece steel car wheel that has a hub portion, a rim portion and a plate portion, which comprises quickly heating the rim of the wheel by induced electrical current, to a temperature below one at which it would be appreciably softened, but to such temperature in excess of the plate and hub temperatures that the plate will be overstrained to a permanent elongation of such extent that when the rim has been cooled to the same temperature as the plate, the plate will be thereby placed under a compression stress and the tread surface of the rim under a tension stress.

3. The method of producing tension in the tread of a one-piece steel car wheel that has a hub portion, a rim portion and a plate portion, which comprises quickly heating the rim of the wheel electrically, to a temperature below one at which it would be appreciably softened, but to such temperature in excess of the plate and hub temperatures that the plate will be overstrained to a permanent elongation of such extent that when the rim has been cooled to the same temperature as the plate, the plate will be thereby placed under a compression stress and the tread surface of the rim under a tension stress.

4. The method of producing tension in the tread of a one-piece steel car wheel that has a hub portion, a rim portion and a plate portion, which comprises quickly heating the rim of the wheel electrically, to a temperature below one at which it would be appreciably softened, but to a temperature of from approximately 375° F. to 450° F. when the rim and hub portions are at room temperature, whereby the plate will be overstrained to a permanent elongation of such extent that when the rim has been cooled to the same temperature as the plate, the plate will be thereby placed under a compression stress and the rim under a tension stress.

5. The method which comprises making a one-piece steel car wheel having hub, plate and rim portions, with the rim in compression and the plate in tension, machining the tread surface of the wheel to accurate contour, while the rim is still under compression, heating the rim electrically to a temperature below one at which it will be appreciably softened and without materially increasing the temperature of the plate and the hub, the heat being to such degree that the plate will be overstrained to a permanent elongation of such extent that when the rim has been cooled to the same temperature as the plate, the plate will thereby be placed under a compression stress and the rim under a tension stress.

6. The method which comprises making a one-piece steel car wheel having hub, plate and rim portions, with the rim in compression and the plate in tension, heating the rim electrically to a temperature below one at which it will be appreciably softened and without materially increasing the temperature of the plate and the hub, the heating being to such degree that the plate will be overstrained to a permanent elongation of such extent that when the rim has been cooled to the same temperature as the plate, the plate will be thereby placed under a compression stress and the rim under a tension stress.

LOUIS E. ENDSLEY.